Feb. 10, 1959  C. E. EPPINGER  2,873,123
BABY CARRIAGES
Filed Oct. 8, 1956  2 Sheets-Sheet 1
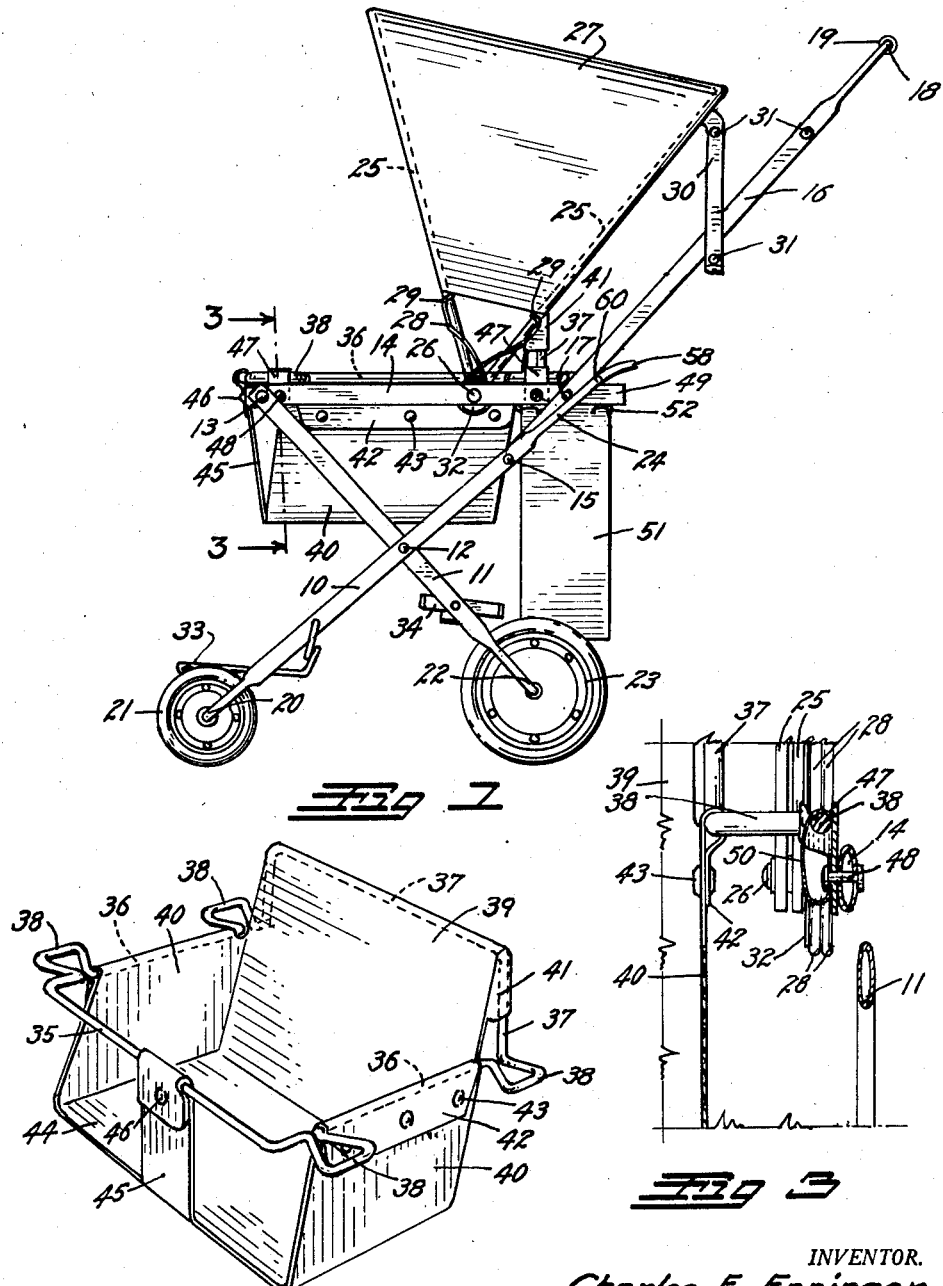
INVENTOR.
Charles E. Eppinger
BY
ATTORNEY Feb. 10, 1959 C. E. EPPINGER 2,873,123
BABY CARRIAGES
Filed Oct. 8, 1956 2 Sheets-Sheet 2
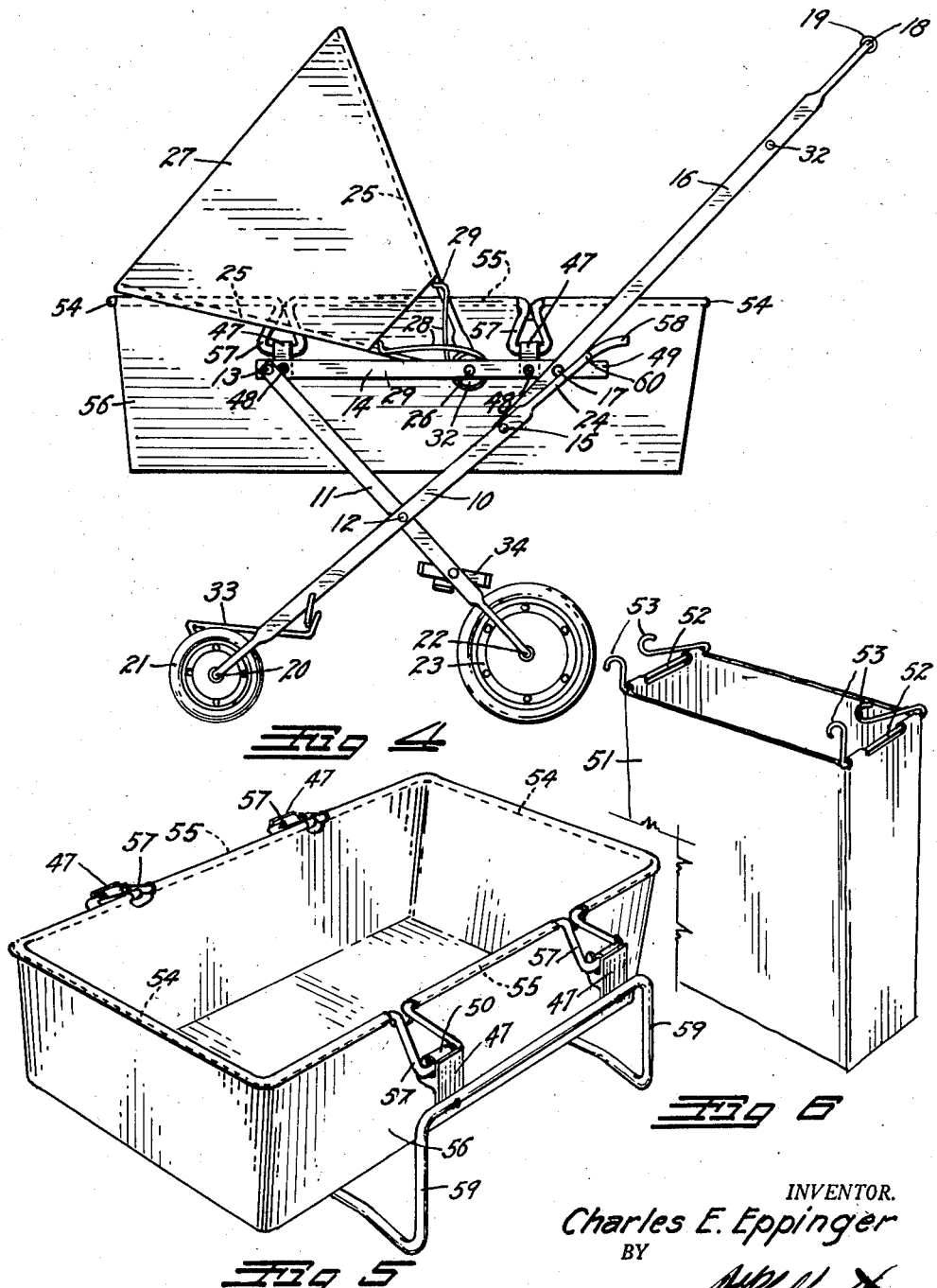
INVENTOR.
Charles E. Eppinger
BY
ATTORNEY United States Patent Office 2,873,123
Patented Feb. 10, 1959

2,873,123

BABY CARRIAGES

Charles E. Eppinger, Denver, Colo.

Application October 8, 1956, Serial No. 614,605

2 Claims. (Cl. 280—41)

This invention relates to a baby carriage and has for its principal object the provision of a wheeled carriage structure which can be quickly, easily and efficiently converted to provide a structure which can be adapted for use as a wheeled reclining bed structure of the conventional baby carriage type; a wheeled upright seat structure of the type known as a "stroller"; a car bed supporting an infant in a reclining position on an automobile seat; or as a seat for supporting the infant in a sitting position in an automobile.

Another object of the invention is to provide a wheeled supporting frame for the improved device that can be quickly and easily folded into a relatively small lightweight package for carrying or storing.

A further object is to provide a seat structure and a bed structure which can be interchangeably used in the wheeled supporting frame, and which can be removed from and used independently of the wheeled supporting frame to provide either a seat or a bed for an infant in an automobile.

A still further object is to provide a container which can be easily and quickly attached to or removed from the wheeled supporting frame for use in carrying the baby's paraphernalia or other desired articles.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Fig. 1 of the drawing illustrates a side elevational view of the improved baby carriage illustrating it arranged as a "stroller" for wheeling the baby in an uprigh sitting position.

Fig. 2 is a perspective view of a seat device which can be applied to or removed from the improved carriage structure.

Fig. 3 is an enlarged, detail section, taken on the line 3—3, Fig. 1.

Fig. 4 is a side elevational view of the improved carriage illustrating it arranged as a conventional baby carriage for wheeling the baby in a reclining position.

Fig. 5 is a perspective view illustrating a bed device as used in the arrangement of Fig. 4.

Fig. 6 is a perspective view, partially broken away, of an article carrying attachment or bag which may be easily and securely attached to or removed from the improved baby carriage.

Briefly, the improved baby handling device comprises a portable, foldable, wheeled frame to which either a child's seat device or a child's bed device can be quickly and easily applied to provide either a baby carriage or a baby stroller, and from which the seat device and bed device may be removed for independent use.

The foldable, portable, wheeled frame of the carriage employs two side frame structures, each of which consists of a pair of crossed frame bars 10 and 11 pivotally secured together adjacent their mid-portions by means of a suitable pivot rivet 12. The frame bar 11 at each side of the carriage is pivotally secured at its upper and forward extremity, by means of a second pivot rivet 13, to a horizontally extending side frame member 14. The side frame bar 10 at each side of the carriage is secured adjacent its upper extremity, by means of a third pivot rivet 15, to the lower extremity of a handle lever 16. Each handle lever 16 is hingedly mounted on one of the frame members 14 adjacent the rear extremity of the latter upon a fourth pivot rivet 17. The upper extremities of the two handle levers 16 are connected by means of a horizontal handle bar 18 which may be formed integrally with levers and which is covered by an elongated, sleeve-like hand grip 19.

The lower extremities of the two frame bars 10 are connected together by means of a front axle bar 20 which may be formed integrally with the frame bars 10 to form a U-shaped structure. The front axle bar extends through and between a pair of front wheels 21 to provide an axle for the latter. The lower extremities of the two frame bars 11 are similarly connected together by means of a rear axle bar 22 which may be formed integrally with the frame bar 11 to form a U-shaped unit. The rear axle bar 22 extends through and between a pair of rear wheels 23 to provide an axle therefor. The axle bars 20 and 22 may be each made up from two sections which, after being passed through the wheels, are welded or otherwise secured together to provide single, complete axles.

The upper extremity of each frame bar 10 extends beyond the third pivot rivet 15, as shown at 24, thence turns inwardly at a right angle to form a locking portion 60, thence rearwardly to form a handle portion 58. The side frame members 14 extend rearwardly from the pivot rivets 17 to form latching extremities 49. The two side frame structures, as above described, are braced from each other and maintained in rigid parallel spaced-apart relation by means of the two axle bars 20 and 22 and the handle bar 18. The frame structures may be formed from any desired material. It is preferred to form them from tubing which has been flattened to form the members 10, 11, 14, and 16, and which remains round to form the members 18, 20, 22, and 24.

By swinging the handle levers 16 forwardly, the rear extremities of the frame bars 10 are swung upwardly and rearwardly into alignment with the frame member 14 so that the X-structure at each side will be collapsed into alignment with each other and with the handle levers 16 for carrying purposes.

The frame structure can be erected by simply swinging the handle levers 16 rearwardly and upwardly to expand the X-structures at each side. As the fully erected position is approached, the handle portions 58 on the frame bars 10 will frictionally slide over the latching extremities 49 on the side frame members 14 and flex the upper extremities 24 of the frame bars 10 outwardly until the fully erected position is reached, at which time the inwardly extending locking portions 60 will snap over the tops of the latching members 49 behind the handle levers 16 to lock the structure in the erected position of Figs. 1 and 4.

A pair of inverted U-shaped visor bars 25 are rotatably mounted at their lower extremities on pivot members 26, there being one pivot member extending through each side frame member 14. A fixed, cylindrical drum member 32 is affixed to each side frame member about each pivot member 26. A visor 27, formed of fabric or other suitable flexible material, is secured about the two visor bars 25 and extends therebetween to form an awning or visor. The two visor bars 25 are constantly urged away from each other to maintain the flexible material of the visor 27 taut, by means of coiled springs 28, one of which surrounds each of the drum members 32. The extremities of the springs 28 are extended upwardly and hooked about the visor bars 25, as indicated at 29.

The coiled portions of the springs 28 act to grip the drum members as the extremities of each spring move away from each other. Therefore, the awning or visor can be released by simply urging the two visor bars toward each other to tend to uncoil and enlarge the coil of the coiled portions of the springs so that they will release their grip on the drum members 32. The visor can then be adjusted to any desired angle and, when released, the springs will grip their drums to maintain the desired adjusted position. When the visor is not desired, it can be strapped back to the handle levers 16 by means of suitable tie straps 30 provided with conventional snap fasteners 31.

A locking device 34 is tiltably mounted on one of the frame members 11 so that it may be tilted into engagement with one of the rear wheels 23 to prevent rotation of the latter and a suitable foot rest structure 33 is removably supported upon the front axle bar 20. The carrigae frame structure above described is designed to receive either a bed device or a seat device and an article carrying attachment.

The seat device is illustrated in Figs. 1 and 2 and comprises a continuous frame rod or tube bent to form a straight front portion 35 and two side portions 36, all lying in a common horizontal plane, and an elevated back portion 37 joining the rear extremities of the two side portions 36. Two outwardly extending, spaced-apart supporting loops 38 are formed in each of the two side portions 36. A flexible seat structure formed from a sheet of suitable flexible material is suspended from the frame tube. The seat structure is formed with two side sheets 40, a back sheet 39, and a bottom sheet 44. The back sheet 39 is provided with a downwardly opening pocket 41 which can be slipped over the upstanding back portion 37 and the side sheets 40 are provided with flaps 42 which extend over the side portions 36 and which may be snapped in place thereover by means of suitable snap fasteners 43. The forward mid-portion of the bottom sheet 44 is supported by means of a central supporting strap 45, the upper extremity of which is secured about the front portion 35 by means of a suitable snap fastener 46.

The seat device of Fig. 2, above described, is designed to be positioned between the two side frame members 14, as shown in Fig. 1. The side frame members are provided with hooked bracket members 47 which are secured on the inside faces of the frame members 14 by means of suitable rivets 48. The supporting loops 38 of the seat structure are rested in the hooks of the bracket members 47 and are locked therein by means of hooked, leaf, snap springs 40, as shown in Fig. 3.

The article carrier, illustrated more in detail in Fig. 6, comprises a substantially rectangular, vertical bag 51 of fabric or other suitable material, the side portions of which are supported from elongated wire hook members 52. The extremities of each hook member 52 are turned upwardly and formed into a hook-shape to provide a pair of supporting hooks 53 at the upper extremity of each side of the bag 51. When the seat device of Fig. 2 is in place in the frame structure, the two pairs of hooks 53 are hooked about the two sides of the two rearmost supporting loops 38 so that the bag 51 will be suspended between the rear extremities of the two frame members 14, as shown in Fig. 1.

When it is desired to use the improved carriage as a bed for the baby, the seat device of Fig. 2 and the carrier of Fig. 6 are removed from the wheeled frame by snapping the hooked extremities of the springs 50 from the loops 38 and lifting the seat structure from place.

The latter structure is then replaced by a bed device such as illustrated in Fig. 5. The bed device consists of a substantially rectangular flexible hammock 56 suspended around its entire upper periphery from an endless rim rod or tube. The rim tube is preformed to provide two end bed portions 54 and two side bed portions 55. Each of the two side bed portions 55 of the rim tube are bent to form two spaced-apart supporting loops 57 which extend outwardly and downwardly at each side of the bed or hammock 56. The spacing of the supporting loops 57 corresponds to the spacing of the supporting loops 38 previously described. The bed structure is mounted in the wheeled frame similarly to the seat device previously described, with the supporting loops resting in the hooks of the bracket members 47, with the snap springs 50 locking them in place therein, similarly to the previously described form so as to present the appearance of Fig. 4.

The supporting loops 38 of the seat device and the supporting loops 57 of the bed device form convenient handles for carrying the baby in these devices when desired. The bed device can be removed from the wheeled frame and placed in a suitable supporting frame 59, as shown in Fig. 5. The frame 59 is provided with four of the bracket members 47 having the snap springs 50 so that the loops 57 of the bed rim tube can be secured therein similarly to the manner in which the bed structure is mounted in the wheeled frame of Fig. 4. The seat device of Fig. 2 can be similarly mounted in the supporting frame 59.

The supporting frame can be placed on the seat of an automobile and in combination with the seat and bed device provides convenient and safe sleeping and sitting arrangements for the baby.

While a specific form of the improvement has been described and illustrated herein, it is desired to be understood that the same may be varied, within the scope of the appended claims, without departing from the spirit of the invention.

Having thus described the invention, what is claimed and desired secured by Letter Patent is:

1. In a baby carriage having two side frame members; a pivot member extending inwardly from each side frame member; a pair of inverted, U-shaped visor bars pivoted at their lower extremities on said pivot members; a flexible visor secured to and extending between said visor bars; a spring concentrically coiled about each pivot member, with its extremities in engagement with said visor bars and acting to constantly urge said two visor bars away from each other to maintain said visor taut; and a stationary cylindrical drum secured to each side frame member about each pivot member, said drums being positioned within the coils of said springs so that contraction of said coils will cause them to frictionally engage said drums to resist rotation of said visor bars about said pivot members.

2. A portable, foldable wheeled frame for a baby carriage having two side frame structures, each side frame structure comprising: a first frame bar extending upwardly and forwardly; a second frame bar extending upwardly and rearwardly across said first frame bar; a first pivot member pivotally securing said two frame bars together at their middles; a horizontal frame bar pivotally secured at its forward extremity to the upper extremity of said first frame bar; means extending between the two side frame structures and maintaining the latter in parallel spaced relation; an inverted U-shaped handle member pivotally mounted adjacent each of its lower extremities to one of said horizontal frame bars and extending downwardly therefrom, each of said horizontal frame bars extending rearwardly from the pivotal mounting of said handle member; a second pivot member in each side frame structure pivoting one of the downwardly extending extremities of said handle member to the second frame bar in said structure adjacent the upper extremity of the latter, each of said second frame bars extending upwardly from said second pivot; and an inwardly extending hooked portion formed in the upper extremity of each of said second side frame members, each of said inwardly extending hooked portions being adapted to be hooked over the rearwardly extending extremity of one of said horizontal frame members rearward of said handle member when said side frame structures are erected to lock said frame members in the erected position.

References Cited in the file of this patent

UNITED STATES PATENTS

| | | |
|---|---|---|
| 655,874 | Johnson | Aug. 14, 1900 |
| 1,470,630 | Mahr | Oct. 16, 1923 |
| 1,726,752 | Mirkin | Sept. 3, 1929 |
| 2,023,813 | Jolly | Dec. 10, 1935 |
| 2,455,119 | Hall | Nov. 30, 1948 |
| 2,524,352 | Kiser | Oct. 3, 1950 |
| 2,616,719 | Heideman | Nov. 4, 1952 |
| 2,674,462 | Dracos | Apr. 6, 1954 |
| 2,776,165 | Schricker | Jan. 1, 1957 |

FOREIGN PATENTS

| | | |
|---|---|---|
| 488,567 | Canada | Dec. 2, 1952 |